(12) United States Patent
Aichinger-Rosenberger et al.

(10) Patent No.: US 10,485,067 B2
(45) Date of Patent: Nov. 19, 2019

(54) METHOD AND LIGHT SYSTEM FOR PROTECTION FROM DAZZLING LIGHT AND MACHINE HAVING THE LIGHT SYSTEM

(71) Applicant: HELLA GmbH & Co. KGaA, Lippstadt (DE)

(72) Inventors: Michael Aichinger-Rosenberger, Spitz-Donau (AT); Andreas Hingel, Enzersdorf an der Fischa (AT); Christoph Jandrisits, Olbendorf (AT); Christian Derkits, St. Michael im Burgenland (AT); Michael Garber, Vienna (AT); Daniel Kramer, Wiesmoor (DE); Thomas Posnicek, Haitzendorf (AT); Karlheinz Kellner, Krems (AT)

(73) Assignee: HELLA GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 16/180,516

(22) Filed: Nov. 5, 2018

(65) Prior Publication Data

US 2019/0150243 A1    May 16, 2019

(30) Foreign Application Priority Data

Nov. 10, 2017 (DE) .................. 10 2017 220 013

(51) Int. Cl.
| | |
|---|---|
| *H05B 33/08* | (2006.01) |
| *B60Q 3/80* | (2017.01) |
| *B60Q 1/14* | (2006.01) |

(52) U.S. Cl.
CPC ......... *H05B 33/0851* (2013.01); *B60Q 1/143* (2013.01); *B60Q 3/80* (2017.02); *B60Q 2300/23* (2013.01); *B60Q 2300/45* (2013.01)

(58) Field of Classification Search
None
See application file for complete search history.

(56) References Cited

U.S. PATENT DOCUMENTS

| | | | | | |
|---|---|---|---|---|---|
| 2009/0021955 | A1* | 1/2009 | Kuang | ............... | H05B 33/0803 362/479 |
| 2012/0306379 | A1* | 12/2012 | Frost | .................. | H05B 33/0869 315/151 |

FOREIGN PATENT DOCUMENTS

| | | |
|---|---|---|
| DE | 102007026750 A1 | 1/2009 |
| DE | 102013104274 A1 | 10/2014 |

(Continued)

OTHER PUBLICATIONS

Extended European Search Report for European Application No. 18205368.6 dated Apr. 12, 2019, with its English summary, 10 pages.

*Primary Examiner* — Jany Richardson
(74) *Attorney, Agent, or Firm* — Rudy J. Ng; Bret E. Field; Bozicevic, Field & Francis LLP

(57) ABSTRACT

The present invention relates to a method for protecting a user of a light system (100), which comprises multiple illuminants (L1-L6), at least one light sensor (30) and at least one coding unit (40), from dazzling light from at least one of the illuminants (L1-L6), comprising the following steps: creating of a respective coding for light (M1-M6) of the individual illuminants (L1-L6) by the at least one coding unit (40), detecting of dazzling light (M2X) from at least one of the illuminants (L1-L6) by the at least one light sensor (30), assigning of the detected dazzling light (M2X) with the at least one associated illuminant (L2) on the basis of the coding of the light for the corresponding illuminant (L2), and setting of the at least one associated illuminant (L2) to protect the user from the detected dazzling light (M2X). The invention furthermore relates to a light system (100) and a (Continued)

machine (200) having the light system (100) for carrying out a method according to the invention.

16 Claims, 1 Drawing Sheet

(56) References Cited

FOREIGN PATENT DOCUMENTS

DE 102013104276 A1 10/2014
WO WO2017207185 A1 12/2017

\* cited by examiner

METHOD AND LIGHT SYSTEM FOR PROTECTION FROM DAZZLING LIGHT AND MACHINE HAVING THE LIGHT SYSTEM

The present invention relates to a method for protecting a user of a light system from dazzling light from at least one illuminant of the light system. The invention furthermore relates to a light system for carrying out such a method and a machine having the light system.

Various self-dazzling protection systems are known in the prior art. For example, a dimmer having movement sensor and light sensor for dazzling protection for living area applications is disclosed in US 2014125234 A1. In the case of self-dazzling protection systems for machines, it is therefore fundamentally possible to differentiate in this case between internal and external protection systems for self-dazzling protection.

Internal self-dazzling protection systems have a light sensor and/or a light reference sensor which is installed in or on a headlight housing. In this case, one or more headlights of a vehicle can have an integrated light sensor. Such a light sensor reacts to reflected light. The light sensor can act actively or passively. An active light sensor generates an electrical variable due to the incident light. A passive light sensor changes its internal electrical properties in dependence on the incident light. The active or passive change of the light sensor is interpreted in an analog and/or digital manner and has effects on the current to the headlight. The light intensity is automatically adapted to the reflected light by the increase or decrease of the current in dependence on a light sensor signal. The more light is reflected, the lower the current becomes and the less the emitted light becomes, until the headlight has reached a level at which dazzling no longer occurs. The threshold value or setpoint value perceived as unpleasant, from which dimming is to be performed, is dependent on the intended use and can be adapted by changing the circuit parameters.

External self-dazzling protection systems react integrally to incident light, similarly to internal self-dazzling protection systems. An external self-dazzling protection system recognizes whether light is reflected to a driver of a work machine having the self-dazzling protection system or not. External light sensors can be placed independently of the headlight in this case. In external self-dazzling protection systems, an expanded data transfer between light sensors and headlights additionally has to be ensured. For this purpose, the light sensor can be placed closer to the eye of the driver in the case of external self-dazzling protection systems. The closer the light sensor is positioned to the eye of the driver, the more efficiently can dazzling of the driver be detected.

The above-described self-dazzling protection systems share the feature that it could heretofore not be differentiated in the case of reflected light from which illuminant the reflected light originates. Therefore, when dazzling light is recognized, only the brightness of the entire headlight system can be dimmed or, in case of emergency, turned off in order to prevent dazzling of the worker. This is unsatisfactory, for example, in the case of work using a machine on the field. Alternatively, individual headlights can be dimmed or turned off according to the principle of random chance or according to feeling. However, this takes a relatively long time and can distract the user of the light system from the actual work.

The object of the present invention is to at least partially take into account the above described problems. In particular, it is the object of the present invention to provide a method, a light system, and a machine having the light system for simple, rapid, and targeted protection of a user of the light system from dazzling light from the light system.

The above object is achieved by the patent claims. In particular, the above object is achieved by the method according to claim 1, the light system according to claim 10, and the machine according to claim 14. Further advantages of the invention result from the dependent claims, the description, and the drawings. In this case, features and details which are described in conjunction with the method also apply, of course, in conjunction with the light system according to the invention and the machine according to the invention and vice versa, respectively, and therefore mutual reference always is or can be made to the individual aspects of the invention with respect to the disclosure.

According to a first aspect of the invention, a method is provided for protecting a user of a light system, which comprises multiple illuminants, at least one light sensor, and at least one coding unit, from dazzling light from at least one of the illuminants. The method comprises the following steps:

creating of a respective coding for light of the individual illuminants by the at least one coding unit, detecting of dazzling light from at least one of the illuminants by the at least one light sensor, assigning of the detected dazzling light with the at least one associated illuminant on the basis of the coding of the light for the corresponding illuminant, and setting of the at least one associated illuminant to protect the user from the detected dazzling light.

Because each light from each illuminant receives a different coding, when dazzling light is detected, it can be recognized reliably and rapidly from which illuminant or from which illuminants the dazzling light or the dazzling lights originate. Subsequently, it is accordingly possible to react rapidly to the recognized dazzling light by setting the respective dazzling illuminant as desired. The dazzling light source or the corresponding illuminant can be dimmed, turned off, and/or adjusted in its position, i.e., for example, turned or displaced, in the scope of the setting.

One or more coding units can be used to produce the coding. It is accordingly possible that a separate coding unit is associated with each illuminant.

In the scope of the setting of the at least one associated illuminant, the detected dazzling light can be compared to a setpoint value or a setpoint light intensity, i.e., dazzling light is to be understood as light which has a light intensity greater than a predefined set point value or threshold value. If it is established that the dazzling light or the detected light is greater than the setpoint value, the illuminant or the light of the illuminant can be adjusted accordingly, i.e., dimmed, turned off, and/or changed with respect to its position.

The illuminants are preferably arranged in the form of an illuminant matrix in at least one light module for generating the working light. A particularly fine setting of the working lighting with respect to a desired illumination and the dimming is possible by matrix lighting. A matrix working light enables the explicit illumination of defined regions and can thus also be used efficiently for dazzling protection, by setting individual illuminants and/or light pixels as desired.

The illuminant as the smallest light unit of the light system can therefore be understood as a light pixel of the illuminant matrix. The illuminant matrix can comprise multiple rows of lights and multiple columns of lights, wherein multiple illuminants are respectively arranged in each row of lights and each column of lights. The light system and accordingly also the illuminant matrix can thus comprise at least four illuminants, which are arranged in at least two columns and at least two rows.

The light system is preferably designed as a mobile light system. The light system is configured for mobile working use, for example, in and/or on a corresponding mobile machine.

In a light system according to the invention, it can be advantageous if the illuminants or the illuminant matrix or the light modules, respectively, have a converter connected upstream, which can convert the coding into corresponding light signals. A control unit for transmitting and/or generating the coding is preferably connected upstream of the converter or the converters. The control unit can be designed in the form of a so-called light control unit (LCU). The LCU can furthermore be configured and designed for analyzing the light signals detected by the at least one light sensor. The task of the LCU can alternatively or additionally also be assumed by another control unit such as a so-called body control module (BCM), which can have a signal connection to the LCU.

The individual illuminants of the light module can be embodied as delimited from one another or slightly overlapping. The number of the illuminants can fundamentally be selected freely within technical limits. A reasonable number of illuminants can be selected in dependence on the intended use and installation options.

The at least one associated illuminant being set on the basis of the detected dazzling light is to be understood to mean that the at least one associated illuminant is set using the coding of the detected dazzling light. The detected dazzling light can originate from one or more illuminants. In addition to the detected dazzling light and/or the coding thereof, still further signals and/or items of information can be used to set the at least one associated illuminant.

The present invention relates in particular to a light system in the form of a working lighting system for a machine. Such a working lighting system differs in particular from the technical fields of roads or living area lights. Such a working lighting system preferably has a brightness, for which a road approval for a motor vehicle would not be possible. The working lighting system under discussion is to be suitable in particular for mobile machines such as agricultural machines. Agricultural machines can be tractors, combines, harvesters, or the like.

In such a working lighting system, one of the illuminants and/or one light module can already be designed to generate working light having at least 2000 lm, i.e., the illuminant and/or the light module are capable of generating working light having a luminous flux of at least 2000 lm. It is furthermore possible that in a light system according to the invention, multiple illuminants or light modules are arranged for generating working light of at least 2000 lm in each case. The working light of the light system can thus be elevated, for example, to 4000 lm, 6000 lm, or even above 10000 lm. Such a luminous flux can decide in the case of machines of the type in question, in particular in difficult weather and/or environmental conditions, as to whether the work can be satisfactorily performed or not.

According to a further embodiment of the present invention, it is possible that the coding is carried out by means of pulse width modulation in a method. Pulse width modulation has proven to be a reliable method for producing the respective codings and experiments in the scope of the present invention.

Moreover, it is possible that in a method according to the invention, the coding has a predefined duty cycle, i.e., the coded light has the predefined duty cycle or is set using the predefined duty cycle. The duty cycle, by which the light can be output as correspondingly pulsed light, has also proven to be a simple and reliable coding means. In extensive experiments which were carried out in the scope of the present invention, it has furthermore been shown that a duty cycle between 95% and 99%, in particular between 97% and 98% is advantageous. In particular, a duty cycle of 97.5% has proven to be particularly advantageous. Both a sufficient brightness can be reached and also a reliable and differentiating coding can be achieved using such a duty cycle.

It can furthermore be advantageous if the coding has a predefined frequency in a method according to the invention, i.e., each illuminant is activated at a different frequency or carrier frequency. Informative coding of the light may also thus be effectuated. The respective codings preferably have different frequencies, wherein the frequencies differ from one another by at least 5 Hz, in particular in a range from 20 Hz to 30 Hz, preferably by approximately 30 Hz, i.e., the different illuminants have lights having a corresponding frequency band interval. Duty cycle and frequency band interval of the pulse width modulation are preferably set in accordance with a sampling rate of the light sensor in this case. A photodiode is preferably used as the light sensor and at least one LED is preferably used as the illuminant.

In addition, it is possible in a method according to the present invention that the frequency of the coding has a rate between 100 Hz and 10000 Hz, in particular between 1000 Hz and 3000 Hz. In particular at a rate from 1000 Hz, negative effects on a user of the light system can be prevented, which have been shown at a lower frequency. The coding can additionally comprise a predefined bit coding. Informative inferences about the origin of the detected light or dazzling light may also be drawn in this way.

In a further modification variant of the present invention, it is possible that in a method, the at least one associated illuminant is set using an eye tracking system for detecting items of viewing information of a user of the light system and in consideration of the detected items of viewing information. The working light can be set in a targeted manner to the requirements of the user of the light system by the use of the eye tracking system.

According to a further aspect of the present invention, a light system is provided. The light system comprises multiple illuminants, at least one light sensor for detecting the lights of the illuminants, at least one coding unit for the different coding of the lights of the illuminants, and a control unit for controlling the coding unit. The control unit has a signal connection to the at least one light sensor and the at least one coding unit and is designed to carry out a method as described in detail above. A light system according to the invention is thus accompanied by the same advantages as have been described in detail with respect to the method according to the invention. The coding unit can be designed in the form of a control unit, for example, in the form of the LCU. The LCU can furthermore be configured and designed for analyzing the light signals detected by the at least one light sensor. The task of the LCU can alternatively or additionally be assumed by another control unit such as the BCM, which can have a signal connection to the LCU.

In one embodiment variant of the present invention, it is possible that the illuminants each comprise an LED or are each embodied as LEDs. LEDs have proven themselves as sufficiently bright and energy-saving illuminants.

Furthermore, it has proven to be advantageous if in a light system, the at least one light sensor is arranged on or in the immediate vicinity of at least one of the illuminants. The illuminant can therefore have an integrated light sensor or light reference sensor. In particular, multiple illuminants of the light system can each be equipped with a light sensor or at least one light sensor can be arranged on multiple illuminants. The light system can in particular be set as desired in a targeted manner in relation to third parties by the positioning of the light sensor on or in at least one of the illuminants.

It can furthermore be advantageous if, in a light system according to the invention, an eye tracking system for detecting a user's items of viewing information of the light system is arranged, wherein the control unit is designed to set the at least one associated illuminant in dependence on the detected items of viewing information. The eye tracking system can be designed in the form of a headset, which the user can put on like a type of spectacles. The eye movement of the user can thus be detected particularly accurately. The eye tracking system can also be arranged decentralized from the user, for example, in a driver cab of a machine in the field of vision of the user. The unrestricted movement and vision freedom can thus be ensured for the user.

According to a further aspect of the present invention, a machine having a light system as described above is provided, wherein the machine has a cab for the user of the light system. A machine according to the invention is thus also accompanied by the above-described advantages. In a machine according to the invention, it can be advantageous if the at least one light sensor is arranged in the cab, in particular in the field of vision and at the eye level of a user located and working in the cab. The user can thus be protected from dazzling light in a simple and reliable manner. The at least one light sensor is preferably arranged in the cab such that it is located in the vicinity of the eyes of the user, for example, on average closer than 50 cm to the eyes of the user. A working position, in particular a seated position of the user is to be presumed in this case.

Further measures which improve the invention result from the following description of various exemplary embodiments of the invention, which are schematically illustrated in the figures. All features and/or advantages originating from the claims, the description, or the drawing, including constructive details and spatial arrangements, can be essential to the invention both per se and also in the various combinations.

The invention will be explained in greater detail hereafter on the basis of the appended drawings. In the figures.

Figure 1:
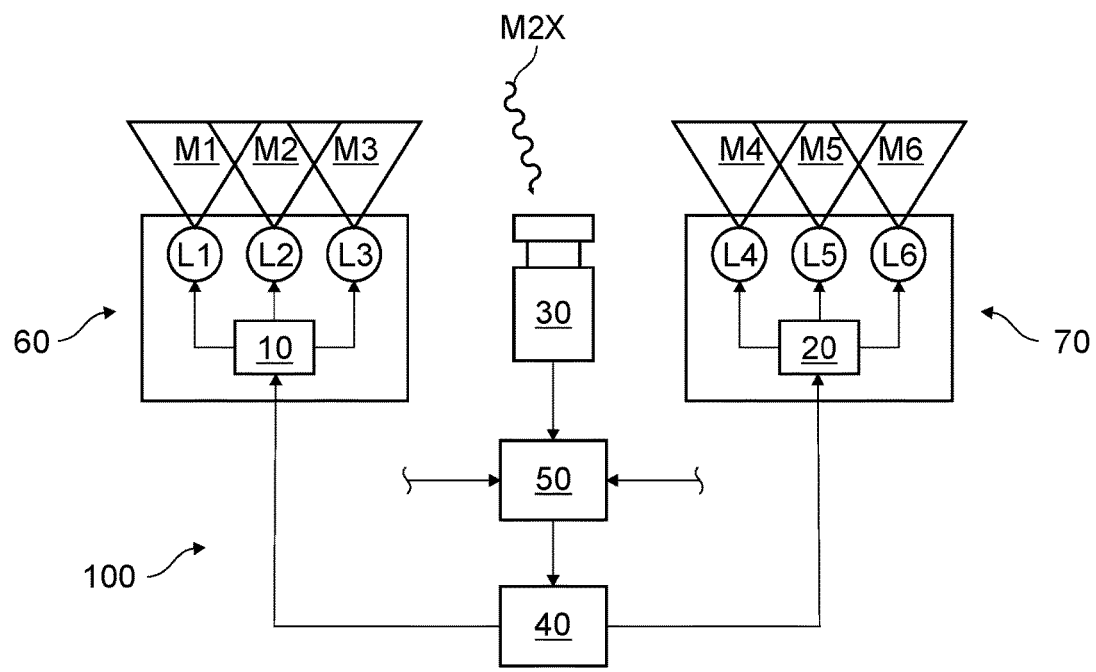
FIG. 1 shows a light system according to an embodiment to the invention.
Figure 2:
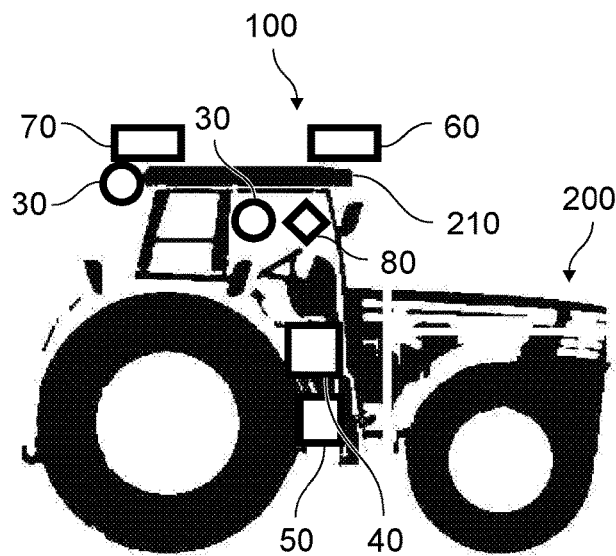
FIG. 2 shows a machine having a light system according to the invention.

Elements having identical function and mode of operation are each provided with the same reference signs in FIGS. 1 and 2.

FIG. 1 shows a light system 100 having multiple illuminants L1-L6 in the form of LEDs. The light system 100 has a light sensor 30 for detecting the lights M1-M6 of the illuminants L1-L6 in the form of a photodiode, a coding unit 40 for different coding of the lights M1-M6 of the illuminants L1-L6, and a control unit 50 in the form of a LCU for controlling the coding unit 40. The control unit 50 has a signal connection to the light sensor 30 and the coding unit 40 and is configured and designed for carrying out a method described in detail hereafter. The LCU is preferably connected to a power source and to a BUS system for transmitting the desired modulation data.

The light system shown in FIG. 1 has a first light module 60 and a second light module 70, wherein three illuminants are arranged in each of the two light modules 60, 70. A first converter 10 for converting the coding for the illuminants L1-L3 is arranged in the first light modules 60 and a second converter 20 for converting the coding for the illuminants L4-L6 is arranged in the second light module 70. The converters 10, 20 each have a signal connection to the coding unit 40. The pulse-width-modulated signal transmitted by the coding unit 40 can be converted by the converters 10, 20 into corresponding light signals at the illuminants L1-L6.

A method for protecting a user of the light system 100 from dazzling light will be explained hereafter with reference to FIG. 1. For this purpose, in a first step S1, the light M1-M6 of the individual illuminants L1-L6 is firstly provided with a respective coding by the coding unit 40. The coding is carried out by means of pulse width modulation and has a predefined duty cycle at approximately 97.5% and a frequency having a rate of approximately 1000 Hz. The frequency band interval of the respective frequencies is approximately 30 Hz. Alternatively thereto, a predefined bit coding would also be possible. The coding unit 40 has a modulation module for the pulse width modulation for converting power into the desired pulsed signal.

In a second step S2, dazzling light M2X is detected by the light sensor 30, i.e., the light sensor 30 detects reflected light from illuminant L2, which has an excessively bright value at the light sensor 30, i.e., exceeds a predefined setpoint value. Superimposed frequencies can be separated from ambient light and from one another for this purpose by a Fourier transform.

In a third step S3, the detected dazzling light M2X is associated with the associated illuminant L2 on the basis of the coding of the light for the corresponding illuminant L2.

Subsequently, in a fourth step S4, the illuminant L2 is set to protect the user from the detected dazzling light M2X on the basis of the detected dazzling light M2X. Steps S2 to S4 can be repeated as long and as often as necessary until dazzling is no longer present.

A machine 200 in the form of a tractor having a light system 100 is illustrated in FIG. 2. The light system 100 at least substantially corresponds to the light system 100 described above with reference to FIG. 1. The machine 200 has a cab 210 for a user of the light system 100. The light system 100 illustrated in FIG. 2 comprises two light sensors 30, wherein one of the light sensors 30 is arranged in the cab 210 in the field of vision and at the eye level of a user (not shown) located in the cab 210 and the other light sensor is arranged on the light module 70.

As illustrated in FIG. 2, the light system 100 furthermore comprises an eye tracking system 80 for detecting items of viewing information of the user of the light system 100, wherein the control unit 50 is designed to set the associated illuminant L2 in dependence on detected items of viewing information.

In addition to the illustrated embodiment, the invention permits further design principles i.e., the invention should not be considered to be restricted to the embodiments illustrated in the figures.

LIST OF REFERENCE SIGNS 10 converter
20 converter
30 light sensor
40 coding unit
50 control unit
60 light module 70 light module
80 eye tracking system
100 light system
L1 illuminant
L2 illuminant
L3 illuminant
L4 illuminant
L5 illuminant
L6 illuminant
M1 light
M2 light
M3 light
M4 light
M5 light
M6 light

The invention claimed is:

1. A method for protecting a user of a light system, which comprises multiple illuminants, at least one light sensor, and at least one coding unit, from dazzling light from at least one of the illuminants, comprising the following steps:
creating of a respective coding for light of the individual illuminants by the at least one coding unit,
detecting of dazzling light from at least one of the illuminants by the at least one light sensor,
assigning of the detected dazzling light with the at least one associated illuminant on the basis of the coding of the light for the corresponding illuminant, and
setting of the at least one associated illuminant to protect the user from the detected dazzling light.

2. The method according to claim 1, wherein the coding is carried out by means of pulse width modulation.

3. The method according to claim 2, wherein the coding has a predefined duty cycle.

4. The method according to claim 3, wherein the duty cycle is between 95% and 99%.

5. The method according to claim 2, wherein the coding has a predefined frequency.

6. The method according to claim 5, wherein the respective codings have different frequencies, wherein the frequencies differ from one another by at least 5 Hz.

7. The according to claim 5, wherein the frequency of the coding has a rate between 100 Hz and 10000 Hz.

8. The method according to claim 1, wherein the coding has a predefined bit coding.

9. The method according to claim 1, wherein the at least one associated illuminant is set using an eye tracking system for detecting items of viewing information of a user of the light system and in consideration of the detected items of viewing information.

10. A light system, comprising:
multiple illuminants,
at least one light sensor for sensing the lights of the illuminants,
at least one coding unit for the differing coding of the lights of the illuminants, and
a control unit for controlling the coding unit,
wherein the control unit has a signal connection to the at least one light sensor and the at least one coding unit and is configured and designed to carry out a method comprising the following steps:
creating of a respective coding for light of the individual illuminants by the at least one coding unit,
detecting of dazzling light from at least one of the illuminants by the at least one light sensor,
assigning of the detected dazzling light with the at least one associated illuminant on the basis of the coding of the light for the corresponding illuminant, and
setting of the at least one associated illuminant to protect the user from the detected dazzling light.

11. The light system according to claim 10, wherein the illuminants each comprise an LED or are each embodied as LEDs.

12. The light system according to claim 10, wherein the at least one light sensor is arranged on or in the immediate vicinity of at least one of the illuminants.

13. The light system according to claim 10, wherein an eye tracking system is arranged for detecting items of viewing information of a user of the light system, wherein the control unit is designed to set the at least one associated illuminant in dependence on the detected items of viewing information.

14. A machine having a light system as claimed in claim 10, comprising a cabin for a user of the light system.

15. The machine according to claim 14, wherein the at least one light sensor is arranged in the cabin.

16. The machine according to claim 14, wherein the at least one light sensor is arranged in the range of vision and at the eye level of a user located and working in the cabin.

* * * * *